L. R. FAUGHT.
Turning Lathe.
No. 60,163.
Patented Dec. 4, 1866.
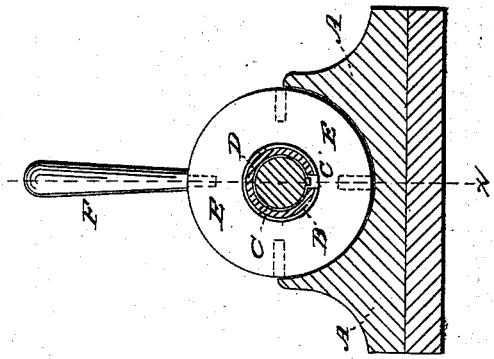
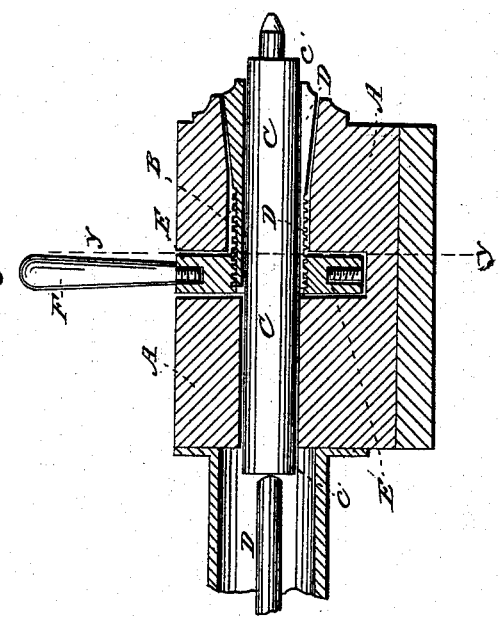

United States Patent Office.

IMPROVEMENT IN TURNING-LATHES.

LUTHER R. FAUGHT, OF PHILADELPHIA, PENNSYLVANIA.

Letters Patent No. 60,163, dated December 4, 1866.

SPECIFICATION

TO ALL WHOM IT MAY CONCERN:

Be it known that I, LUTHER R. FAUGHT, of Philadelphia, in the county of Philadelphia, and State of Pennsylvania, have invented a new and useful Improvement in Lathes; and I do hereby declare that the following is a full, clear, and exact description thereof, which will enable others skilled in the art to make and use the same, reference being had to the accompanying drawings, forming part of this specification, in which—

Figure 1 is a vertical longitudinal section of a portion of a lathe showing my improvement, taken through the line $x\,x$, fig. 2.

Figure 2 is a vertical cross-section of the same, taken through the line $y\,y$, fig. 1.

Similar letters of reference indicate like parts.

My invention has for its object to furnish an improved means for tightening the spindle in lathe-stocks; and it consists of the combination of a nut and sleeve, constructed and arranged as hereinafter more fully described, with the spindle and stock of a lathe.

A is the tail-stock of a lathe, B is the end of the feed-screw, and C is the spindle. D is a sleeve, the forward end of which is cone-shaped to fit into a cone-shaped hole in the stock A, as shown in fig. 1. The rear end of the sleeve D is straight, and has a coarse screw-thread cut upon it, as shown. The sleeve D is slotted its whole length, and the thicker or cone-shaped part is grooved longitudinally to give it sufficient spring to close around the spindle C, when drawn further into the cone-shaped hole in the stock A, in the manner hereinafter described. E is a circular nut, which is fitted so nicely into a notch formed in the stock A for its reception, that it may bear upon both sides of said notch, and yet be so loose as to be readily turned by the handle F. This handle is screwed into a hole formed in the nut E, as shown. Other holes are formed in the nut, so that the handle F may be shifted as desired for operating the nut E, on to compensate for the wear of the parts. A screw-thread is formed in the nut E, which fits upon the screw-thread formed upon the sleeve D. Upon the spindle C is formed a feather, $c'$, which fits into the slot formed in the sleeve D, and when the sleeve is drawn in by the action of the nut E, the sleeve, spindle, and nut are clamped firmly together. By this arrangement the wear of the parts does not interfere with holding the work with steadiness, so as to size and finish it with accuracy.

What I claim as new, and desire to secure by Letters Patent, is—

An improved binder for lathe-spindles, formed by combining the nut E, and sleeve D, constructed and arranged as herein described, with each other, and with the spindle C, and stock A, substantially as described, and for the purpose set forth.

LUTHER R. FAUGHT.

Witnesses:
J. E. HU WILSON,
CHAS. W. BREADE.